United States Patent
Gray et al.

(10) Patent No.: US 9,218,410 B2
(45) Date of Patent: Dec. 22, 2015

(54) SYSTEMS, APPARATUSES AND METHODS FOR COMMUNICATION FLOW MODIFICATION

(71) Applicant: CONTACT SOLUTIONS LLC, Reston, VA (US)

(72) Inventors: Joshua Gray, Reston, VA (US); Mike Hibbard, Clear Brook, VA (US); Randal E. Holl, Annapolis, MD (US); James J. Dellostritto, Jordan, NY (US)

(73) Assignee: CONTACT SOLUTIONS LLC, Reston, VA (US)

( * ) Notice: Subject to any disclaimer, the term of this patent is extended or adjusted under 35 U.S.C. 154(b) by 0 days.

(21) Appl. No.: 14/616,037

(22) Filed: Feb. 6, 2015

(65) Prior Publication Data
US 2015/0220619 A1    Aug. 6, 2015

Related U.S. Application Data

(60) Provisional application No. 61/936,639, filed on Feb. 6, 2014.

(51) Int. Cl.
  *G06F 17/00*    (2006.01)
  *G06F 7/00*    (2006.01)
  (Continued)

(52) U.S. Cl.
  CPC ........ *G06F 17/30598* (2013.01); *G06F 3/0482* (2013.01); *G06F 3/04842* (2013.01); *G06F 3/167* (2013.01); *G06F 17/30327* (2013.01)

(58) Field of Classification Search
  CPC ..... H04M 3/493; G06F 19/3456; G06F 21/10
  USPC ......................................................... 707/738
  See application file for complete search history.

(56) References Cited

U.S. PATENT DOCUMENTS

| 4,797,925 A | 1/1989 | Lin |
| 5,493,608 A | 2/1996 | O'Sullivan |

(Continued)

FOREIGN PATENT DOCUMENTS

| AU | 2001249276 A2 | 10/2001 |
| WO | WO 2007/086038 | 8/2007 |

(Continued)

OTHER PUBLICATIONS

[Author Unknown] "Optimizing Adaptive Server Anywhere Performance Over a WAN", iAnywhere Solutions, Inc., a subsidiary of Sybase, Inc., 9 pages (2005).

(Continued)

*Primary Examiner* — Pavan Mamillapalli
(74) *Attorney, Agent, or Firm* — Cooley LLP

(57) ABSTRACT

An apparatus includes a user interface module configured to receive user information associated with a user. The apparatus also includes a classification module configured to apply a classifier defined within a classification tree to the user information, and to calculate a classification score representing an estimated likelihood that the user is associated with at least one user type. The classification module is also configured to classify the user to an identified user type based on the classification score. The apparatus also includes a database configured to store at least one of user account information associated with the user, historical information associated with the user, or historical information associated with a group of users including the user. The apparatus also includes an interface generation module configured to generate a signal based on the information in the database, the signal specifying a user interface to be presented to the user.

27 Claims, 9 Drawing Sheets

(51) Int. Cl.
*G06F 17/30* (2006.01)
*G06F 3/16* (2006.01)
*G06F 3/0482* (2013.01)
*G06F 3/0484* (2013.01)

(56) References Cited

U.S. PATENT DOCUMENTS

| | | | |
|---|---|---|---|
| 5,553,121 A | 9/1996 | Martin et al. | |
| 5,562,453 A | 10/1996 | Wen | |
| 5,600,776 A | 2/1997 | Johnson et al. | |
| 5,615,257 A | 3/1997 | Pezzullo et al. | |
| 5,870,709 A | 2/1999 | Bernstein | |
| 5,874,962 A | 2/1999 | De Judicibus et al. | |
| 6,035,018 A | 3/2000 | Kaufman | |
| 6,069,939 A | 5/2000 | Fung et al. | |
| 6,146,147 A | 11/2000 | Wasowicz | |
| 6,167,395 A | 12/2000 | Beck et al. | |
| 6,226,364 B1 | 5/2001 | O'Neil | |
| 6,401,075 B1 | 6/2002 | Mason et al. | |
| 6,459,776 B1 | 10/2002 | Aktas et al. | |
| 6,462,759 B1 | 10/2002 | Kurtzberg et al. | |
| 6,487,277 B2 | 11/2002 | Beyda et al. | |
| 6,496,692 B1 | 12/2002 | Shanahan | |
| 6,856,333 B2 | 2/2005 | Ullmann et al. | |
| 6,981,242 B2 | 12/2005 | Lehmeier et al. | |
| 6,985,865 B1 | 1/2006 | Packingham et al. | |
| 7,024,366 B1 | 4/2006 | Deyoe et al. | |
| 7,039,168 B1 | 5/2006 | Potts | |
| 7,065,188 B1* | 6/2006 | Mei | G10L 15/22 379/76 |
| 7,089,592 B2 | 8/2006 | Adjaoute | |
| 7,143,029 B2 | 11/2006 | Elshafei | |
| 7,146,419 B1 | 12/2006 | O'Rourke et al. | |
| 7,194,409 B2 | 3/2007 | Balentine et al. | |
| 7,221,933 B2 | 5/2007 | Sauer et al. | |
| 7,224,790 B1* | 5/2007 | Bushey et al. | 379/265.13 |
| 7,325,037 B2 | 1/2008 | Lawson | |
| 7,385,997 B2 | 6/2008 | Gorti et al. | |
| 7,415,100 B2 | 8/2008 | Cooper et al. | |
| 7,447,662 B2 | 11/2008 | Gibson | |
| 7,457,395 B2 | 11/2008 | Creamer et al. | |
| 7,498,860 B2 | 3/2009 | Bhattacharya | |
| 7,515,695 B1 | 4/2009 | Chan et al. | |
| 7,519,049 B2 | 4/2009 | Masuda | |
| 7,525,970 B2 | 4/2009 | Mangin et al. | |
| 7,573,986 B2 | 8/2009 | Balentine et al. | |
| 7,577,709 B1* | 8/2009 | Kolcz | G06K 9/6217 706/20 |
| 7,610,040 B2 | 10/2009 | Cantini et al. | |
| 7,620,894 B1 | 11/2009 | Kahn | |
| 7,653,543 B1 | 1/2010 | Blair et al. | |
| 7,665,024 B1 | 2/2010 | Kondziela | |
| 7,665,140 B2 | 2/2010 | Oliver et al. | |
| 7,680,035 B2 | 3/2010 | Krishnan | |
| 7,729,915 B2 | 6/2010 | Balentine et al. | |
| 7,787,543 B2 | 8/2010 | Yamaguchi | |
| 7,801,284 B1 | 9/2010 | Chakra et al. | |
| 7,808,918 B2 | 10/2010 | Bugenhagen | |
| 7,809,569 B2 | 10/2010 | Attwater et al. | |
| 7,817,784 B2 | 10/2010 | Wang et al. | |
| 7,836,409 B2 | 11/2010 | Denoue et al. | |
| 7,865,841 B2 | 1/2011 | Morikawa | |
| 7,903,792 B2 | 3/2011 | Balentine et al. | |
| 7,904,387 B2 | 3/2011 | Geering | |
| 7,920,682 B2 | 4/2011 | Byrne et al. | |
| 7,970,615 B2 | 6/2011 | Attwater et al. | |
| 8,000,689 B2 | 8/2011 | Featherstone et al. | |
| 8,027,255 B2 | 9/2011 | Kahn et al. | |
| 8,046,420 B2 | 10/2011 | Pan | |
| 8,068,609 B2 | 11/2011 | Puranik et al. | |
| 8,090,867 B2 | 1/2012 | Katis et al. | |
| 8,094,788 B1 | 1/2012 | Eberle et al. | |
| 8,096,657 B2 | 1/2012 | Pompilio et al. | |
| 8,107,999 B2 | 1/2012 | Pandruvada | |
| 8,108,509 B2 | 1/2012 | Chatani | |
| 8,131,553 B2 | 3/2012 | Attwater et al. | |
| 8,131,615 B2 | 3/2012 | Diev et al. | |
| 8,145,562 B2 | 3/2012 | Wasserblat et al. | |
| 8,155,948 B2 | 4/2012 | Ruano et al. | |
| 8,171,123 B2 | 5/2012 | Takeda et al. | |
| 8,190,554 B2 | 5/2012 | Chen et al. | |
| 8,213,579 B2 | 7/2012 | Balentine et al. | |
| 8,223,945 B2 | 7/2012 | Drovdahl et al. | |
| 8,233,613 B1 | 7/2012 | Michaelis et al. | |
| 8,254,552 B2 | 8/2012 | Harton et al. | |
| 8,280,833 B2 | 10/2012 | Miltonberger | |
| 8,370,520 B2 | 2/2013 | Kohli et al. | |
| 8,379,830 B1 | 2/2013 | Naik et al. | |
| 8,400,491 B1 | 3/2013 | Panpaliya et al. | |
| 8,458,090 B1 | 6/2013 | Batra et al. | |
| 8,495,244 B2 | 7/2013 | Bonar et al. | |
| 8,595,218 B2 | 11/2013 | Bell et al. | |
| 8,619,602 B2 | 12/2013 | Begen | |
| 8,635,345 B2 | 1/2014 | Brown et al. | |
| 8,681,951 B1* | 3/2014 | Lavian | H04W 4/206 348/14.01 |
| 8,880,631 B2 | 11/2014 | Logan et al. | |
| 2002/0080938 A1 | 6/2002 | Alexander, III et al. | |
| 2002/0090062 A1 | 7/2002 | Mohamed Alhadad et al. | |
| 2002/0116466 A1 | 8/2002 | Trevithick et al. | |
| 2002/0124258 A1 | 9/2002 | Fritsch | |
| 2002/0135618 A1* | 9/2002 | Maes | G06F 3/0481 715/767 |
| 2003/0031185 A1 | 2/2003 | Kikuchi et al. | |
| 2003/0064716 A1 | 4/2003 | Gailey et al. | |
| 2003/0191639 A1 | 10/2003 | Mazza | |
| 2004/0045036 A1 | 3/2004 | Terasaki | |
| 2004/0258223 A1 | 12/2004 | Rahamim | |
| 2005/0047556 A1 | 3/2005 | Somerville et al. | |
| 2005/0058149 A1 | 3/2005 | Howe | |
| 2005/0100022 A1 | 5/2005 | Ramprashad | |
| 2006/0034287 A1 | 2/2006 | Novack et al. | |
| 2006/0036442 A1 | 2/2006 | Novack et al. | |
| 2006/0126803 A1 | 6/2006 | Patel et al. | |
| 2006/0245357 A1 | 11/2006 | Ilan | |
| 2006/0271367 A1 | 11/2006 | Hirabayashi et al. | |
| 2007/0036323 A1 | 2/2007 | Travis | |
| 2007/0038705 A1* | 2/2007 | Chickering et al. | 709/206 |
| 2007/0053346 A1 | 3/2007 | Bettis et al. | |
| 2007/0119923 A1 | 5/2007 | Garrison et al. | |
| 2007/0250318 A1 | 10/2007 | Waserblat et al. | |
| 2008/0004881 A1 | 1/2008 | Attwater et al. | |
| 2008/0103761 A1 | 5/2008 | Printz et al. | |
| 2008/0123627 A1 | 5/2008 | Moreman et al. | |
| 2008/0216172 A1 | 9/2008 | Forman et al. | |
| 2009/0041216 A1 | 2/2009 | Balk et al. | |
| 2009/0327422 A1 | 12/2009 | Katis et al. | |
| 2010/0002692 A1 | 1/2010 | Bims | |
| 2010/0121974 A1 | 5/2010 | Einarsson et al. | |
| 2010/0166158 A1 | 7/2010 | Costello et al. | |
| 2010/0293090 A1 | 11/2010 | Domenikos et al. | |
| 2010/0310059 A1 | 12/2010 | Davis et al. | |
| 2011/0159854 A1 | 6/2011 | Kedefors et al. | |
| 2011/0164744 A1 | 7/2011 | Olshansky et al. | |
| 2011/0282778 A1 | 11/2011 | Wright et al. | |
| 2012/0209630 A1 | 8/2012 | Ihm et al. | |
| 2012/0253805 A1 | 10/2012 | Rajakumar et al. | |
| 2012/0310652 A1 | 12/2012 | O'Sullivan | |
| 2013/0018795 A1 | 1/2013 | Kolhatkar et al. | |
| 2013/0058248 A1 | 3/2013 | Singh et al. | |
| 2013/0069858 A1 | 3/2013 | O'Sullivan | |
| 2013/0070910 A1 | 3/2013 | O'Sullivan | |
| 2013/0070911 A1 | 3/2013 | O'Sullivan | |
| 2013/0079055 A1 | 3/2013 | Jouin | |
| 2013/0177144 A1 | 7/2013 | Forsee et al. | |
| 2013/0183979 A1 | 7/2013 | Chen et al. | |
| 2013/0185802 A1 | 7/2013 | Tibeica et al. | |
| 2013/0204755 A1 | 8/2013 | Zoldi et al. | |
| 2013/0263167 A1 | 10/2013 | Parthasarathy et al. | |
| 2013/0282844 A1 | 10/2013 | Logan et al. | |
| 2013/0317993 A1 | 11/2013 | Wasserman et al. | |
| 2013/0332620 A1 | 12/2013 | Gahm et al. | |
| 2014/0045456 A1 | 2/2014 | Ballai et al. | |
| 2014/0137200 A1 | 5/2014 | Logan et al. | |

(56) References Cited

U.S. PATENT DOCUMENTS

2014/0140213 A1    5/2014  Raleigh et al.
2014/0207518 A1*  7/2014  Kannan .............. G06Q 31/0201
                                                                705/7.29
2014/0237061 A1    8/2014  Logan et al.

FOREIGN PATENT DOCUMENTS

WO    WO 2013/057315 A2    4/2013
WO    WO 2013/163169 A1  10/2013

OTHER PUBLICATIONS

Abdelzaher and Bhatti et al., "Web Server QoS Management by Adaptive Content Delivery", Internet Systems and Applications Laboratory, Hewlett Packard Laboratories, Palo Alto, HPL-1999-161, 11 pages (1999).
Balentine, B., "It's Better to Be a Good Machine Than a Bad Person: Speech Recognition and Other exotic User Interfaces at the Twilight of the Jetsonian Age," ICMI Press, Feb. 1, 2007, 115 pages.
International Search Report and Written Opinion for PCT Application No. PCT/US2013/37779, mailed Jul. 5, 2013, 8 pages.
International Preliminary Report on Patentability for International Application No. PCT/US2013/37779, dated Oct. 28, 2014, 7 pages.
Office Action issued in U.S. Appl. No. 11/211,875, mailed on Mar. 5, 2013, 11 pages.
Office Action issued in U.S. Appl. No. 11/211,875, mailed on Sep. 30, 2013, 14 pages.
Office Action issued in U.S. Appl. No. 11/211,875, mailed on Apr. 6, 2015, 10 pages.
Office Action issued in U.S. Appl. No. 11/781,255, mailed on Mar. 15, 2013, 6 pages.
Office Action issued in U.S. Appl. No. 11/781,255, mailed on Nov. 8, 2013, 8 pages.
Office Action issued in U.S. Appl. No. 11/781,255, mailed on Aug. 14, 2014, 8 pages.
Office Action issued in U.S. Appl. No. 12/171,196, mailed on Mar. 15, 2013, 6 pages.
Office Action issued in U.S. Appl. No. 12/171,196, mailed on Nov. 18, 2013, 9 pages.
Office Action issued in U.S. Appl. No. 12/171,196, mailed on Oct. 22, 2014, 7 pages.
Office Action issued in U.S. Appl. No. 12/475,681, mailed on Oct. 23, 2012, 10 pages.
Office Action issued in U.S. Appl. No. 12/475,681, mailed on Feb. 5, 2013, 13 pages.
Office Action issued in U.S. Appl. No. 12/475,681, mailed on Sep. 25, 2013, 13 pages.
Office Action issued in U.S. Appl. No. 12/475,681, mailed on Apr. 15, 2014, 11 pages.
Stemm and Katz, "A Network Measurement Architecture for Adaptive Applications", *INFOCOM, Nineteenth Annual Joint Conference of the IEEE Computer and Communications Societies, Proceedings, IEEE*, 1:285-294, 10 pages (2000).
Wei et al., "Effective detection of sophisticated online banking fraud on extremely imbalanced data", *World Wide Web, Internet and Web Information Systems*, 16(4):449-475, 29 pages (2013).
Zhang, Dongsong, "Delivery of Personalized and Adaptive Content to Mobile Devices: A Framework and Enabling Technology", *Communications of the Association for Information Systems*, 12(13):183-202, 22 pages (2003).
International Search Report and Written Opinion for International Application No. PCT/US2015/014807, mailed May 18, 2015.

\* cited by examiner

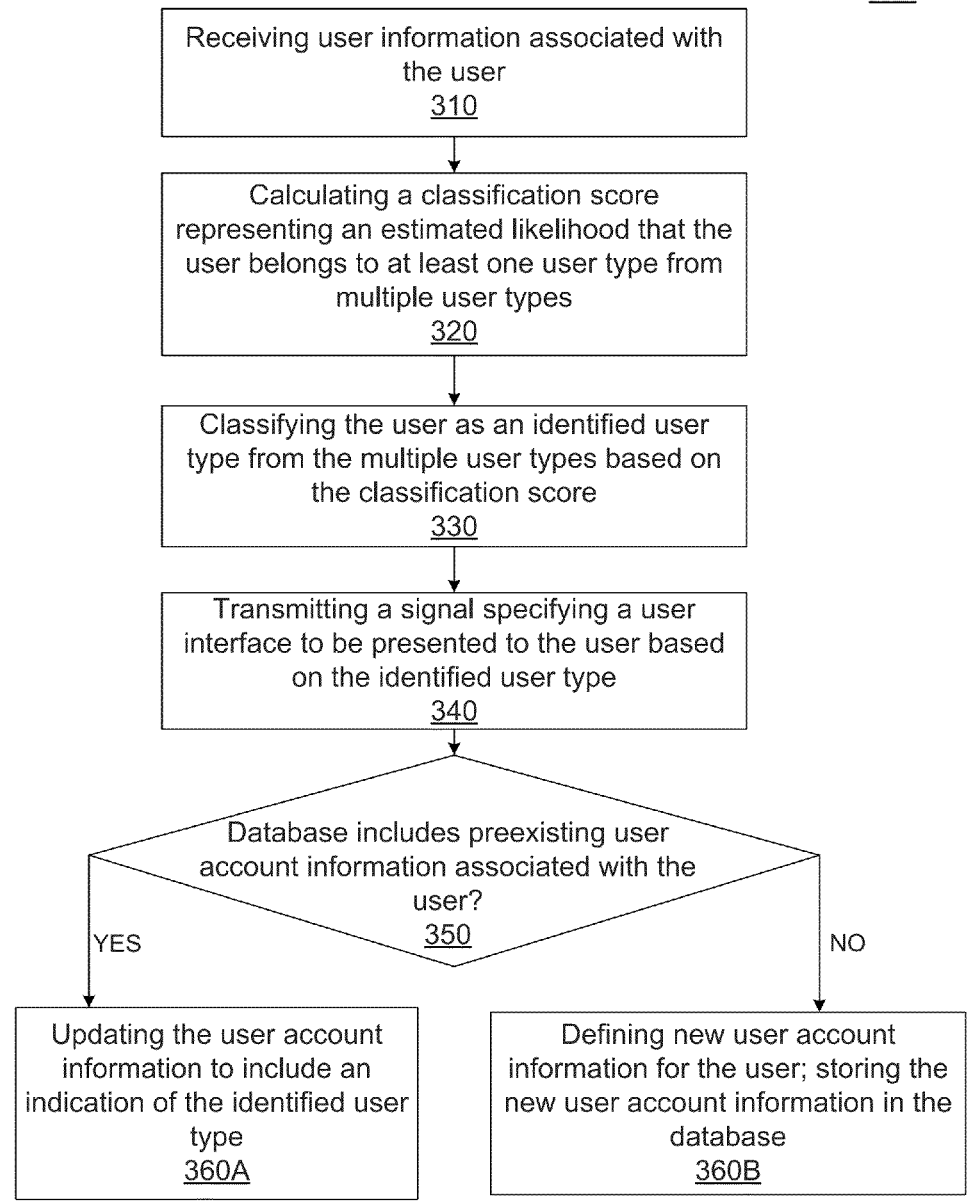

SYSTEMS, APPARATUSES AND METHODS FOR COMMUNICATION FLOW MODIFICATION

CROSS REFERENCE TO RELATED APPLICATIONS

This application claims priority to U.S. Provisional Application Ser. No. 61/936,639 filed Feb. 6, 2014, titled "SYSTEMS, APPARATUSES AND METHODS FOR COMMUNICATION FLOW MODIFICATION", the disclosure of which is incorporated by reference herein in its entirety.

BACKGROUND

Some known mobile-based systems, such as interactive voice response (IVR) systems, allow a user to obtain information and/or conduct mobile transactions without human interaction. Such known systems, however, are not interactive and do not personalize the interaction the user has with the system. Accordingly, a user often must parse through unwanted information and/or long menus prior to receiving desired information and/or conducting a transaction. This can increase annoyance of the user and/or increase the time it takes the user to obtain information and/or conduct transactions using the automated system.

Thus, a need exists for systems, apparatuses, and methods for improving customer service associated with automated customer service systems.

SUMMARY

An apparatus includes a user interface module configured to receive user information associated with a user. The apparatus also includes a classification module configured to apply a classifier defined within a classification tree to the user information, and to calculate a classification score representing an estimated likelihood that the user is associated with at least one user type. The classification module is also configured to classify the user to an identified user type based on the classification score. The apparatus also includes a database configured to store at least one of user account information associated with the user, historical information associated with the user, or historical information associated with a group of users including the user. The apparatus also includes an interface generation module configured to generate a signal based on the information in the database, the signal specifying a user interface to be presented to the user.

BRIEF DESCRIPTION OF THE DRAWINGS

FIG. 3 is a flow chart illustrating a method of the call management system of FIG. 1, according to an embodiment.

DETAILED DESCRIPTION

Figure 1:
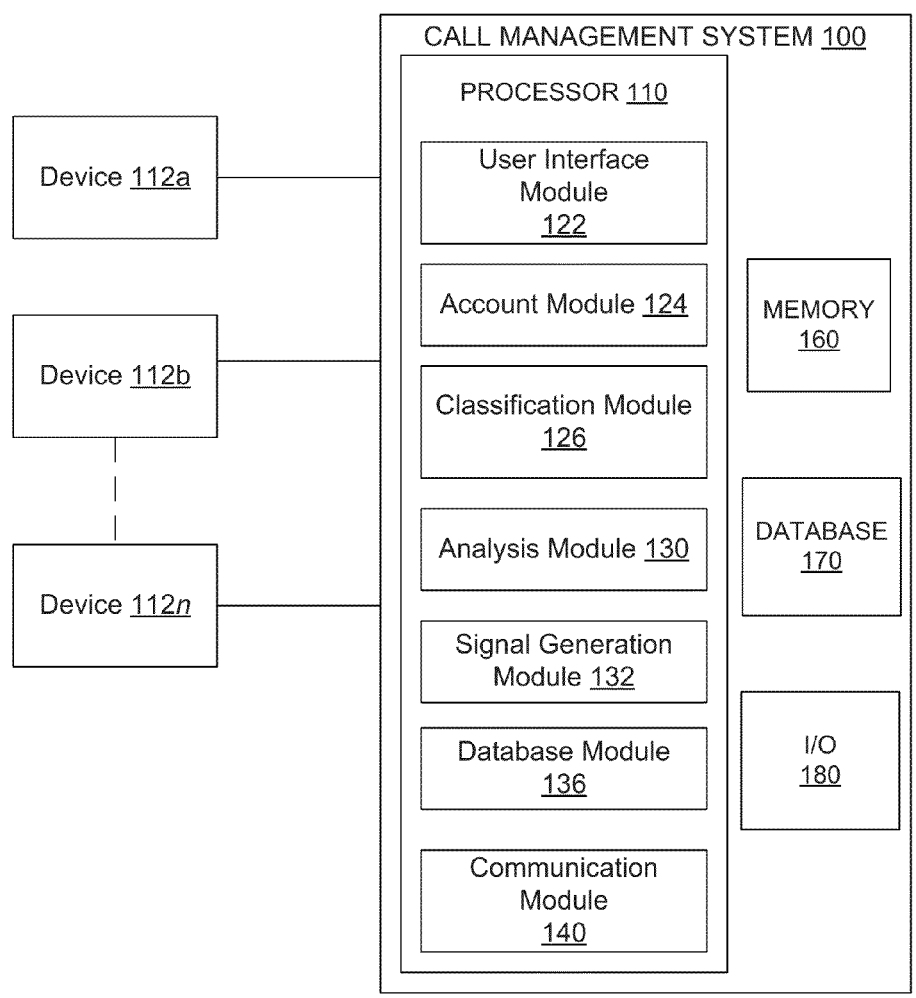
FIG. 1 is an illustration of a call management system, according to an embodiment.

Systems, apparatuses and methods for communication flow modification are described herein. In some embodiments, the communication flow is directed to user self-service. In some embodiments, the communication flow is directed to an interactive voice response (IVR) approach. In some embodiments the communication flow is directed to a mobile device enabled approach, such as based on a cloud computing application. In some embodiments, the communication flow is directed to a web based approach, such as based on a web browser interface. In some embodiments, the communication flow is directed to a text chat-enabled approach, such as web-based chat or mobile chat.

In some embodiments, an apparatus includes a user interface module configured to receive, from a user device associated with a user, user information associated with the user. The apparatus further includes a classification module operatively coupled to the user interface module, the classification module configured to apply a classifier defined within a classification tree to the user information. Applying a classifier further includes calculating a classification score representing an estimated likelihood that the user is associated with at least one user type. The classification module is further configured to classify the user to an identified user type from the plurality of user types based on the classification score. The apparatus further includes a database configured to store at least one of user account information associated with the user, historical information associated with the user, or historical information associated with a group of users including the user. The apparatus further includes an interface generation module configured to generate a signal based on the identified user type, the user account information, the historical information associated with the user, and the historical information associated with the group of users. The signal specifies (e.g., includes an indication of) a user interface to be presented to the user. The user interface module is configured to transmit the signal to the user device.

In some embodiments, an apparatus includes a user interface module of an interactive system. The user interface module is configured to receive, from a user device associated with a user, user information associated with the user. The apparatus further includes a classification module operatively coupled to the user interface module and configured to apply a classifier to the user information. Applying a classifier further includes calculating a classification score representing an estimated likelihood that the user belongs to at least one user type. Each user type is associated with at least one of a different level of fraudulent activity by the user, or a different type of fraudulent activity by the user. The classification module is further configured to classify the user to an identified user type from a set of user types based on the classification score. The user interface module is further configured to transmit a signal to the user device. The signal specifies a user interface for the IVR system to be presented to the user based on the identified user type.

In some embodiments, a method includes receiving at a host device, from a user device associated with a user, user information associated with the user. The method further includes calculating a classification score representing an estimated likelihood that the user belongs to at least one user type. The method further includes classifying the user as an identified user type based on the classification score. The method further includes transmitting a signal to the user device, the signal specifying a user interface to be presented to the user based on the identified user type. The method further includes, if a database associated with the host device includes preexisting user account information associated with the user, updating the user account information to include an indication of the identified user type. The method further includes, if the database does not include preexisting user account information associated with the user: defining new user account information for the user; and storing the new user account information in the database. The new user account information includes an indication of the identified user type.

FIG. 1 is a schematic illustration of an environment within which aspects of a call management system 100 (also referred to as a "system" or an "apparatus" in some instances) can be implemented and employed. The system 100 is operable for use by entities such as the devices 112a-112n.

The devices 112a-112n are associated with users of the system 100, although it is understood that, in some embodiments, the devices 112a-112n can include hardware/software interfaces (e.g., a compute device, a land or mobile phone, a web interface, a mobile phone interface, and/or the like) interacting with the system 100, and/or the like. For example, the device 112a can encompass a mobile phone employed by a user/owner of the phone to call into the system 100, and/or the like. In some embodiments, the devices 112a-112n can include at least a processor and a memory to implement and/or execute a user interface (not shown in FIG. 1).

The system 100 can be in communication with the devices 112a-112n as indicated by solid lines in FIG. 1 via, for example, one or more networks, each of which can be any type of network such as, for example, a local area network (LAN), a wide area network (WAN), a virtual network, a telecommunications network, and/or the Internet, implemented as a wired network and/or a wireless network. Any or all communications can be secured (e.g., encrypted) or unsecured, as is known in the art. The system 100 can be a personal computer, a server, a work station, a tablet, a mobile device, a cloud computing environment, an application or a module running on any of these platforms, and/or the like.

In some embodiments, aspects of the system 100 are operable to monitor how quickly and accurately a user is responding via an input device, such as generally disclosed in U.S. Patent Application Publication No. 2013/0069858 titled "ADAPTIVE COMMUNICATIONS SYSTEM", filed Aug. 26, 2005; and in U.S. Patent Application Publication No. 2013/0070910 titled "ADVANCED ADAPTIVE COMMUNICATIONS SYSTEM (ACS)", filed Jul. 10, 2008, the entire disclosures of which are incorporated herein by reference. In some embodiments, aspects of the system 100 are operable to adapt to the speaking accent of a user, such as generally disclosed in U.S. Patent Application Publication No. 2013/0070911 titled "ADAPTIVE ACCENT VOICE COMMUNICATIONS SYSTEM (AAVCS)", filed Aug. 26, 2005, the entire disclosure of which is incorporated herein by reference. In some embodiments, aspects of the system 100 are operable to automatically monitor and learn from normal in-use behavior exhibited by a human user, such as generally disclosed in U.S. Patent Application Publication No. US2012/0310652 titled "ADAPTIVE HUMAN COMPUTER INTERFACE (AAHCI)", filed Jun. 1, 2009, the entire disclosure of which is incorporated herein by reference. In some embodiments, aspects of the system 100 are operable to automatically adapt to suit the speed at which a user interacts with the system, such as generally disclosed in U.S. Pat. No. 5,493,608 titled "CALLER ADAPTIVE VOICE RESPONSE SYSTEM", filed Mar. 17, 1994, the entire disclosure of which is incorporated herein by reference. In some embodiments, aspects of the system 100 are operable for multi-mode asynchronous communication, such as generally disclosed in U.S. Patent Application Publication No. 2013/0282844 titled "APPARATUS AND METHODS FOR MULTI-MODE ASYNCHRONOUS COMMUNICATION", filed Mar. 12, 2013, the entire disclosure of which is incorporated herein by reference. In some embodiments, aspects of the system 100 are operable for adapting communication based on changes in network/connection parameters, such as strength and/or bandwidth, such as generally disclosed in U.S. patent application Ser. No. 14/587,558 titled METHODS AND APPARATUS FOR ADAPTIVE BANDWIDTH-BASED COMMUNICATION MANAGEMENT", filed Dec. 31, 2014, the entire disclosure of which is incorporated herein by reference.

The system 100 includes at least a processor 110 and a memory 160. FIG. 1A also illustrates a database 170, although it will be understood that, in some embodiments, the database 170 and the memory 160 can be a common data store. In some embodiments, the database 170 constitutes one or more databases. Further, in other embodiments (not shown), at least one database can be external to the system 100. FIG. 1 also illustrates an input/output (UO) component 180, which can depict one or more input/output interfaces, implemented in software and/or hardware, for the devices 112a-112n, and/or other entities to interact directly or indirectly with the system 100.

The memory 160 and/or the database 170 can independently be, for example, a random access memory (RAM), a memory buffer, a hard drive, a database, an erasable programmable read-only memory (EPROM), an electrically erasable read-only memory (EEPROM), a read-only memory (ROM), Flash memory, and/or so forth. The memory 160 and/or the database 170 can store instructions to cause the processor 110 to execute modules, processes and/or functions associated with the system 100.

The processor 110 includes a user interface module 122, an account module 124, a classification module 126, an analysis module 130, a signal generation module 132, a database module 136, and a communication module 140. In some embodiments, the processor 110 can include additional modules (not shown). Each module can independently be a hardware module and/or a software module (implemented in hardware, such as the processor 110).

In some embodiments, the functionality of one or more of the modules can be combined and/or overlap. For example, the communication module 140 and the database module 140 can be a single module. In some embodiments, the functionality of one or more modules and/or the interaction between the modules can be based on regulatory requirements for data processing, storage, integrity, security, and/or the like.

While shown as being implemented in processor 110, in other embodiments, the modules can be distributed. In such embodiments, for example, the analysis module 130 can be at a first processor and/or network device and the database module 136 can be at a second processor and/or network device. Such processors and/or network devices can be communicatively coupled via, for example, a network.

The processor 110 can be any suitable processing device configured to run and/or execute a set of instructions or code. The processor 110 can be, for example, a general purpose processor, a Field Programmable Gate Array (FPGA), an Application Specific Integrated Circuit (ASIC), a Digital Signal Processor (DSP), and/or the like. The processor 110 can be configured to run and/or execute application processes and/or other modules, processes and/or functions associated with the device 100 and/or the network. Any of the devices 112a-112n can also includes a memory and a processor (not shown in FIG. 1).

The communication module 140 can be configured to facilitate network connectivity for the system 100. For example, the communication module 140 can include and/or enable a network interface controller (NIC), wireless connection, a wired port, and/or the like. As such, the communication module 140 can establish and/or maintain a communication session with the devices 112a-112n (e.g., via a network such as the Internet (not shown)). Similarly stated, the communication module 140 can enable the system 100 to send data to and/or receive data from the devices 112a-112n.

The database module 136 is configured for interfacing with the memory 160 and/or the database 170 for data manipulation (including storage, modification, and/or deletion). For example, the database module 136 can be operable for storing user account information (of the user of the device 112a, for example) in the memory 160 and/or the database 170. In another example, the database module 136 can be operable for updating user preferences and/or user type (explained in further detail herein) associated with stored user account information in the memory 160 and/or the database 170.

The user interface module 122 is configured to communicate with the devices 112a-112n, such as to receive user information from the devices 112a-112n, to present a user interface to the devices 112a-112n, and/or the like. In some embodiments, the user interface is interactive-voice response based. In some embodiments, the user interface is web-based. In some embodiments, the user interface module 122 is configured to present a visual, audio and/or haptic user interface to the devices 112a-112n. In some embodiments, the user interface module 122 can request additional information from the devices 112a-112n, to be used in the operation of the other modules, and can receive the requested additional information.

In some embodiments, the user interface module 122 is configured to identify and/or authorize the user device 112a-112n to interact with the system 100 by receiving user identification information. In some embodiments, the user identification information includes device information associated with the user such as, for example, a mobile phone number associated with the device 112a, a media access control (MAC) address, an internet protocol (IP) address, and/or the like. In some embodiments, the user identification information includes biometric information of the user. In some embodiments, the user identification information includes user information entered by the user, such as, for example, a username-password combination. Irrespective of the nature of the identified and/or received user identification information, in some embodiments, the user interface module 122 is operable to communicate with the account module 124 to verify the user identification information against stored user profile information.

In some embodiments, the user interface module 122 is configured to communicate with the signal generation module 132 to determine the user interface to be presented to the user (such as the user of the device 112a, for example) when the user contacts the system 100, such as, for example, when the user places a phone call to the system 100, accesses the system 100 via a web interface, and/or the like. In some embodiments, the user interface module 122 is configured to communicate with the signal generation module 132 to modify the user interface presented to the user, as will be explained in more detail below. In some embodiments, the user interface module 122 is configured to, in concert with the signal generation module 132, modify the user interface presented to the user dynamically, i.e., during interaction with the user. For example, when the device 112b calls into the system 100, the interface module 122 can initially provide an interactive voice recognition (IVR) menu for engaging the user, and then based on the interaction with the user, provide an updated IVR menu during the call to account for the interaction in substantially real-time. In some embodiments, the signal specifies a graphical user interface, such as can be used to configure the interface of a cloud-based application executing on the user device.

The account module 124 is configured to communicate with the memory 160 and/or the database 170 (e.g. via the database module 136) to manage the stored user account information. In some embodiments, the account module 124 is operable to receive updated user account information, and is further operable to update the memory 160 and/or the database 170 (e.g. via the database module 136) with the updated information. As an example, in some embodiments, an existing user updates his user account information, such as specifying a new phone number to be preferably contacted at (i.e., a new engagement preference for engaging with the system 100), and the account module 124 is operable to update the user account of the existing user in the database 170. In some embodiments, the user is a new user, and the account module 124 is operable to generate and store received user account information as a new user account in the database 170 (e.g., as a user profile).

In some embodiments, the interface module 122 and/or the account module 124 is operable to store usage history (e.g., most common tasks performed for a specific user, speed at which the user navigates, language preference, etc.) for the user in the memory 160 and/or the database 170 (e.g. via the database module 136), as associated with, for example, the user account and/or profile of the user. In this manner, each time a user (e.g., the user of device 112a) uses the system 100, details about the transaction/interaction are stored as associated with the user account and/or profile of the user.

The classification module 126 is operable to track a user's interactions when using the user interface. In some embodiments, the classification module 126 can track multiple interactions between the user (e.g., over multiple times the user calls into the system) and the system 100 to infer user interaction and/or engagement preferences of the user when using the system. For example, the classification module 126 can assess the usage history (described above) associated with the user profile to infer user preferences. User preferences can include, but are not limited to, a communication language, a particular transaction, common transactions performed by the user, method of contacting the user (e.g., via email, text message, mobile chat, web-based chat, and/or the like), self-service functions, an ongoing issue the user is facing, and/or the like. In this manner, the classification module 126 is operable to 'learn' user behavior. In some embodiments, the classification module 126 is operable to store and/or update the user preferences in the memory 160 and/or the database 170 (e.g., via the database module 136) as associated with the user account of the user. In some embodiments, updating the user preference(s) can include resetting the user preference(s) to a system default.

In some embodiments, the classification module 126 can use advanced user identification methods to accurately identify the user, such as, for example, geographic location information, a telephone number from which the user is calling/accessing the system 100, a device identifier associated with the device of the user (e.g., a (MAC address, an IP address, etc.), voice recognition, a time of day when the user generally calls/accesses the system 100, etc. In some embodiments, the classification module 126 can assign a classification/confidence score to the user identification, and deem the user as correctly identified when the classification/confidence score meets a predetermined criterion (e.g., is equal to or greater than a minimum threshold).

In some embodiments, the classification module 126 is operable to use historical information stored about a user to classify the user as belonging to one or more profile types. The classification of the user can be based on one or more of the following: one or more manually specified profile types for the user (e.g., by an administrator of the system 100), one or more classification rules, a product and/or service associated with the user, typical day/time information of interactions of the user with the system, device information of devices employed by the user to interact with the system, user performance information of the user as determined by the analysis module (described in further detail herein), anticipated system outages that would affect the user, user history information indicative of when the user would contact/interact with the system again, automated call distribution (ACD) metrics predictive of the user's experience with the system (e.g., Average Wait Time, Queue Depth, Average Handle Time, and/or the like), financial information associated with the user, a customer priority level associated with the user, a personality type associated with the user, user preferences, geographical information associated with the user, social media posts associated with the user, and/or the like.

In some embodiments, the classification module 126 is configured to apply a classifier to the user information received via the user interface module 122. The term "classifier" as used herein encompasses any implementation, in software and/or hardware, of a pattern recognition approach that maps user information to a category, such as, for example, a user type. Categorization of a user to a user type can be based on any parameter by which the user is discernable from at least one other user (e.g., user account information) and/or discernable from a different state of the same user (e.g., when the user is in a different location than he previously was, using a different device of multiple registered user devices, engaging in fraudulent vs. non-fraudulent behavior, the frequency and/or nature of the fraudulent behavior, and/or the like).

The classifier can include both statistical as well as non-statistical approaches (e.g., artificial intelligence approaches) including, but not limited to, one or more of classification trees, regression trees, support vector networks/machines (SVMs), quadratic classifiers, kernel estimation, boosting, decision trees, neural networks, and/or the like. As an example, when the user information includes a telephone number associated with the user device 112a, a classifier can be employed to identify, based on the telephone number, whether the user is calling from his home phone, from his mobile phone, or from his office phone. As another example, when the user information includes a geospatial location of the user, a classifier can attempt to identify a postal code associated with the location of the user.

In some embodiments, the classification module 126 is configured to apply multiple classifiers to the user information, such as in the form of a classification and/or regression tree. In such embodiments, each classifier can define an internal node of the classification tree, and each user type to which the user can be potentially classified can define a terminal node of the classification tree. For example, a three-level classification tree can include: a first classifier for identifying whether the user is calling from his home phone, from his mobile phone, or from his office phone; a second classifier downstream from the first classifier for identifying, in response to identifying that the user is calling from his mobile phone, if he is commuting or at an identifiable location; and a terminal node downstream from the second classifier that classifies the user as a user of device 112a who has left his office and may be currently driving. In this manner, aspects of the system can present a user interface that includes minimal or no tactile input on the user device 112a based on a determination that the user is driving.

In some embodiments, the classification module 126 is configured to employ labeled training data (e.g., user information of a predetermined user type) to undertake supervised training of the classifier. In some embodiments, the classifier includes a support vector network (also sometimes referred to as a support vector machine, or SVM), and the classification module 126 is configured to train the classifier using predetermined user information associated with predetermined user types.

In some embodiments, the classification module 126 is configured to train/employ the classifier in an unsupervised manner to identify one or more user types. Similarly stated, the classifier can identify patterns in user information that were not previously detected, and may or may not be linked to a known user type. As an example, for fraud detection in IVR systems, the classification module 126 can test subsets of user information received over time. If, upon analysis, a dense cluster arises that is indicative of a certain IP address range or area code producing a large percentage of fraud calls (as can be ascertained by other aspects of the system 100), the classification module 126 can identify the cluster as a new user type, and subsequently block calls from sources that map to the new user type. Further, each time a new fraud event is detected (via either manual or automated means), the classification module 126 can use the new fraud event to further refine, tune, and/or generally update the classifier. In some embodiments, a list of users can be associated with the classifier that specifies where events associated with the users from the list should be classified. For example, a whitelist of users can be used to always classify events from a user as non-fraudulent, and/or a blacklist of users can be used to always classify events from a user as fraudulent. In some embodiments, such a whitelist or blacklist can be used in conjunction with the other types of information. For example, if a user's IP address is within a group of IP addresses classified as fraudulent, but the user's credentials are on a whitelist, the user can still be granted access.

In some embodiments, the classification module 126 is configured to classify the user information by calculating a classification score for the user information, for each classifier. The classification score can represent an estimated likelihood that the user belongs to a user type from multiple, possible user types. The classification score and can be calculated in any suitable manner, including via deterministic and/or probabilistic approaches. In some embodiments, the classification score is calculated based on the nature of the classification performed by the classifier; for example, when a classifier identifies a postal code associated with the geospatial location of the user, the classification score associated therewith can account for uncertainty in the geospatial location. In some embodiments, the classification score can be calculated by comparing the user information with the user account information. For example, in some embodiments, the user information can include user device information, and the classification module 126 can calculate the classification score by comparing the user device information (e.g., a phone number of the user device, or an IP address of the user device)

with the user account information (e.g., a registered phone number or registered IP address of the user device).

The classification score can take any suitable form: continuous or discrete, linear or non-linear, numerical and/or character-based, dimensional or dimensionless, deterministic or probabilistic, and/or the like. For example, in some instances, a classification score for the abovementioned example can be a probability of an outcome based on a combination of time of day and the direction the individual is moving. If the time is after 5 pm and changes in the geospatial information indicate that the user is moving away from the office, the classification score that the user is commuting can be relatively high, for example about 80%. In some embodiments, the classification score can be calculated by any suitable multiple-criteria decision analysis approach such as, but not limited to, a weighted sum approach, a weighted product approach, goal programming, and/or the like. For example, the different factors and/or information can be weighted according to a level of confidence that a specific factor denotes certain information. For example, if a user is using an office telephone, this information can be heavily weighted and/or dispositive that the user is at work. For another example, a user using a cell phone might be slightly weighted to indicate that the user is not at work. Such a weighting, however, may be overcome when combined with location data indicating that the user is within the office.

As an example, the classification score at each node/classifier can be calculated based on an approach as illustrated in Eq. (1)

$$S_i = c_i + w_{i1}{}^* x_1 + w_{i2}{}^* x_2 + \ldots + w_{in}{}^* x_n \quad (1)$$

$S_i$ is the classification score that can be compared to a classification criterion. The subscript i denotes the respective user type/classifier outcome (e.g. "commuting"), and the subscripts 1, 2, ..., n denote n variables that can be accounted for in determining user type (e.g., latitude, longitude, speed of motion, time of day, etc.). In Eq. (1), $c_i$ is a constant for the i'th user type/outcome, and $w_{in}$ is the function and/or weight associated with the n'th variable in the computation of the classification score. $x_n$ is the observed value for the n'th variable. In some embodiments (not shown), the classification module 126 is configured to calculate classification scores directly for a terminal node/user type, using approaches similar to Eq. (1).

In some embodiments, the classification module 126 is configured to apply additional information, such as may be requested from devices 112a-112n via the user interface module 122, to the classifier to enable classification of the user information (e.g., to identify a "user type"). It is understood that a "user type" can be a categorization of a user based on any suitable factor(s). The additional user information can be any additional information used and/or desired for classification purposes by a particular classifier, including for example:

geospatial information—location, names of natural and/or artificial features on, above, or below the Earth's surface;

position information—location of the user;

environmental information—information regarding the user's surroundings, including information that may be gleaned from sensors such as temperature sensors, pressure sensors, and/or the like;

motion information—information regarding relative movement of the user;

user device information—information regarding the device being used by the user to communicate with the system 100 (e.g., the user device 112a) including IP address, device type, Mobile Information Device Profile (MIDP), and/or the like;

user authentication information—identifying information used to authenticate the user, including a username/password combination, biometric information, a code, voice recognition, and/or the like; or user expression information—subjective information related to the user as can be extracted by interaction between the user and the user device (e.g., the user device 112a) via machine techniques such as, for example, natural language processing, text analysis, computational linguistics, opinion mining, sentiment analysis, and/or the like.

In some embodiments, the classification module 126 is configured to classify the user to a user type based on the classification score, for example, if the classification score meets a classification criterion. In the above example, the user can be classified as not commuting if the classification score, indicating an estimated likelihood that the user is commuting, is less than 50%, and can be classified as commuting if the classification score is 70% or greater. The classification criterion can specify a mapping between a user type and a value, or multiple values, or range of value for the classification score, or combinations thereof In the above example, the classification criterion can specify, for example, user type "commuting" maps to the classification score >70%; and user type "not commuting" maps to the classification score <50%.

In some embodiments, the classification score does not meet the classification criterion. In the above example, a user cannot be classified as commuting or not commuting if the classification score is 50%-70%. In such embodiments, the classification module 126 can be configured to generate a new user type based on the classification score and/or a range of scores around the classification score. In the above example, if the classification score is 55%, a new user type (e.g., "unknown") can be generated for the 55% value, for a 50%-55% range, for a 55%-60% range, for a 50-70% range, and/or the like. The listing/grouping of user types can be updated to include the new user type, and the classification criterion can be updated to include the new user type as mapping to the new value/range. In embodiments, in which a set of classifiers form a classification tree, a new terminal node can be added to the classification tree for the new user type.

The analysis module 130 is operable to track the behavior of the user during the user's interaction with the system 100. In some embodiments, the behavior of the user is indicative of the user's skill level in interacting with the system 100, and can be used to adapt the user interface in substantially real-time to optimize the user's ongoing interaction with the system (by the recommendation module 132, described later). In some embodiments, aspects of the analysis module 130 are operable to track the speed at which a user interacts with the system, such as generally disclosed in U.S. Pat. No. 5,493,608. In some embodiments, the analysis module 130 is configured to track user behavior over multiple interactions to extract historical information, such as can be used to glean user preferences that are not otherwise explicitly provided by the user. For example, the analysis module 130 can determine that the user selects "Spanish" as a language option 80% of the time. In some embodiments, the analysis module 130 can track user behavior across multiple users to extract historical information for a group of users such as, for example, the level of fraudulent activity in the group of users (e.g., frequency of fraud, magnitude of fraud, and/or the like), the nature of fraudulent activity, or a subset thereof In some embodiments, the database 170 stores the historical information associated with the user, and the historical information associated with the group of users.

The signal generation module 132 is operable to generate a signal specifying a user interface for the interface module 122 when a user interacts with the system 100, and can encompass the scenario in which the signal is generated when the user interaction begins, the scenario in which the user interface is modified during an ongoing interaction, as well as the scenario in which the user interface is modified at the termination of user interaction for the next time the user interacts with the system. In some embodiments, the signal specifies and/or indicates a user interface for an IVR system. In some embodiments, the user interface can include a graphical user interface (GUI). Examples for the format of the signal can include, but are not limited to, voice Extensible Markup Language (voiceXML or VXML), Hypertext Markup Language (HTML), JavaScript Object Notation (JSON), and/or the like. In some embodiments, the format of the signal can be based on capabilities of the user devices 112a-112n.

In some embodiments, the signal is based on user account information as determined by the account module 124 and stored in the memory 160 and/or the database 170. In some embodiments, the signal is based on user preference information as determined by the classification module 126 and stored in the memory 160 and/or the database 170. In some embodiments, the user preference information is dynamically obtained and/or updated during the user's interaction with the system 100, and the signal specifying and/or identifying the user interface is accordingly dynamically updated to modify the user interface presented at the user devices 112a-112n. In some embodiments, the signal is based on the classification of the user to a user profile type, as determined by the classification module 128. In some embodiments, the classification is dynamically obtained and/or updated during the user's interaction with the system 100, and the signal/user interface (UI) is accordingly dynamically updated. In some embodiments, the signal/UI is generated based on the user's tracked behavior with the system 100, as determined by the analysis module 130. In some embodiments, the signal/UI is dynamically updated based on substantially real-time tracking of the user's behavior during the interaction with the system.

In some embodiments, the signal generation module 132 generates and/or modifies the signal for the user interface based on the user type identified and/or determined by the classification module 126. In some embodiments, the signal generation module 132 generates the signal for the user interface based on user account information associated with the user. For example, if the user account information specifies that the user has just received a new credit card and is likely calling to active the new card, the user interface can provide 'card activation' as one of the first options presented to the user.

In some embodiments, the signal generation module 132 generates the signal based on historical information associated with the user, such as can be tracked by the analysis module 130. For example, when the historical information indicates that the user calls about his debit card (and not his credit card) 75% of the time, the signal can specify a user interface that provides "debit card services" as one of the first options presented to the user.

In some embodiments, the signal generation module 132 generates the signal based on historical information associated with a group of users. For example, when the historical information indicates that an IP address has been used in the past by multiple users to fraudulently access the system 100, and the user is calling and/or accessing the system 100 from the same IP address, the signal can specify a user interface that forbids account access, or provides for additional authentication requirements the user must meet to access his account.

In some embodiments, the signal can specify a user interface in the form of a call flow and/or navigation flow including user preferences, to be provided by the user during interaction, as nodes in the call flow. In some embodiments, when a user preference is either explicitly specified beforehand (e.g., as part of the user account information) or derived (e.g., via historical information associated with the user, such as can be determined by the analysis module 130), the node for the user preference can be specified to be skipped during user interaction, or removed from the call flow altogether, when the signal is generated.

In some embodiments, the call flow can account for classification scores and/or the identified user type specified by the classification module 126. In some embodiments, depending on the identified user type associated with a classification score, the call flow can specify how to interact with the user next (e.g., ask for more information if the identified user type is a new user type, forbid further access if the identified user type is a fraudulent user, jump to another node to directly access new card activation procedures, and/or the like).

Figure 2A:
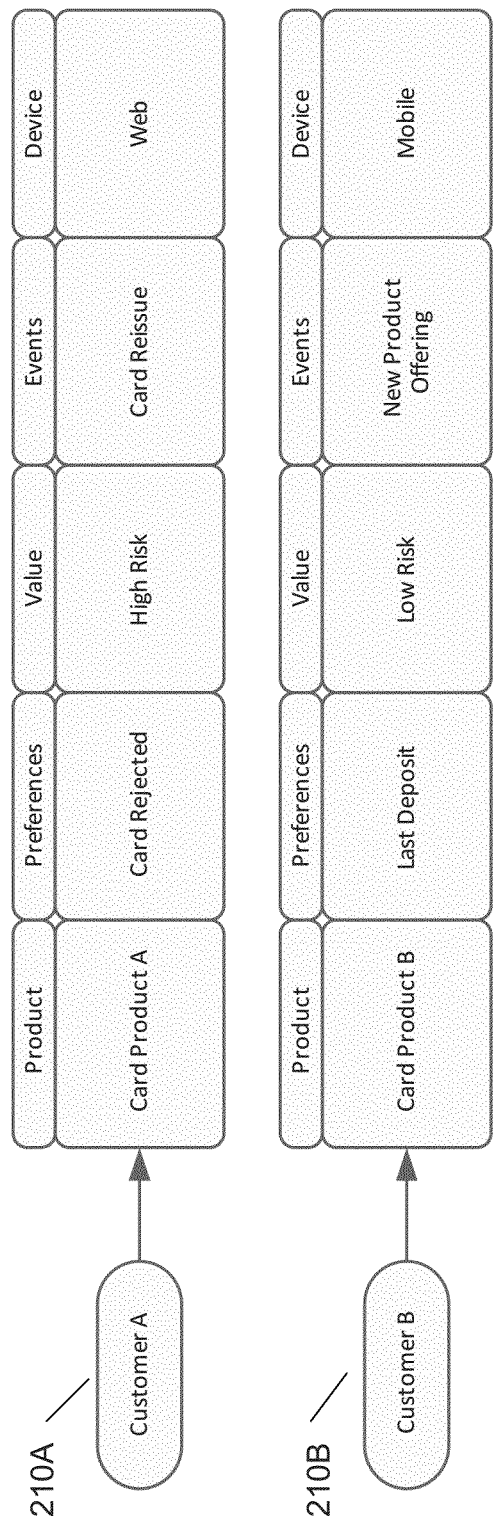
FIG. 2A is an illustration of an example of two different customer profiles, according to an embodiment.

For example, FIG. 2A illustrates two different users/customers with different products, different preferences, different value to the organization employing the system 100, different events for which the system 100 is used and different devices used to access the system 100. Each of these customers can receive different user interfaces based at least in part on these differences. Specifically, user 210A accesses the system 100 via the web (e.g., from a desktop device), and user account information associated with the user 210A indicates that a card (corresponding to card product A) was recently rejected at a merchant ("Preferences"). The user account information can also indicate that the user 210A is a high risk user ("Value"). Hence, user 210A can receive a user interface that requires strict user authentication, is directed to card reissue ("Events"), and is optimized for the web. User 210B, on the other hand, accesses the system 100 via a mobile device, and user account information associated with the user 210B indicates that the user made a deposit recently ("Preferences"). The user account information can also indicate that the user 210B is a low risk user ("Value"). Hence, user 210B can receive a user interface that promotes a new product offering ("Events"), and is optimized for viewing via the mobile device.

Figure 2B:
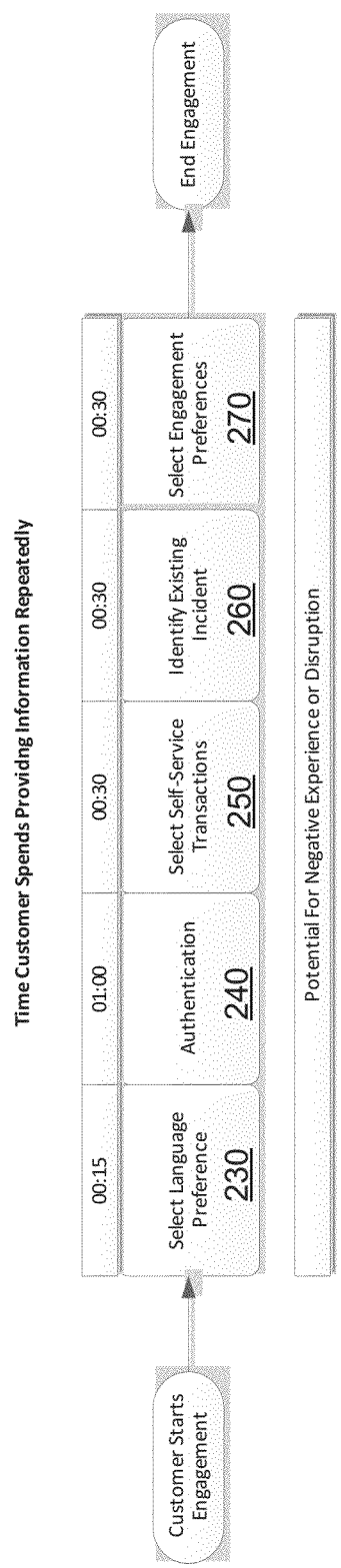
FIG. 2B is an illustration of an example of time spent by a customer in providing customer preferences, according to an embodiment.

As another example, FIG. 2B illustrates the time spent by a user/customer indicating their user/customer services preferences (such as a language preference) and other operations. Such customer preferences can be automatically accounted for the next time the customer accesses the system 100, thereby avoiding redundant entry of information by the customer. Specifically, it can take a user (e.g., user 210A or 210B of FIG. 2A) up to 15 seconds to provide language preferences (at 230), and up to one minute to provide user authentication information (at 240). The user can also waste time browsing irrelevant self-service transaction options (at 250) to pick the desired transaction, addressing any incidents associated with the user account (e.g., late payment) (at 260), selecting other engagement preferences (at 270), and so on. Aspects of the system 100 can reduce or eliminate time spent on some of these interactions, such as by analyzing previous transactions to determine language and/or engagement preferences, identifying the mobile device to automatically authenticate the user, providing incident-related information up front during the interaction, and/or the like.

Returning to FIG. 1, in some embodiments, the signal generation module 132 is operable to dynamically update the user interface presented to the user via the user interface module 122 during interaction with the user based on, for example, reclassification of the user by the classification module 126. In this manner, the classification module 126 can enable dynamic modification of communication between the system 100 and the devices 112a-112n.

In some embodiments, the signal generation module 132 provides the signal specifying and/or identifying the user interface to the user interface module 122 in response to a recommendation request from the user interface module 122 such as when, for example, the device 112a initiates contact with the system 100. In other embodiments, the signal generation module 132 sends the signal specifying the user interface onto the user interface module 132 such as when, for example, a call is placed by the system 100 to a device of a user.

In some embodiments, based on the signal generation module 132 specifying a user interface for a specific user, the user interface can be presented to the specific user. In some embodiments, for example, the user interface may or may not contain advertisements for additional products (e.g., depending on the value of the customer, the customer's historical level of annoyance with advertisements, and the rate at which the customer has responded to advertisements in the past), the user interface may give the customer an option to speak to a live customer service representative (e.g., depending on the value of the customer and the customer's historical level of annoyance with an IVR system), and/or the like.

Explained with reference to FIG. 1, FIG. 3 illustrates a method 300 of generating and transmitting a signal specifying a user interface, such as by the signal generation module 132, according to an embodiment. The method 300 can be performed by the system 100, or any structural/functional equivalent thereof.

At 310, the method 300 includes receiving user information associated with the user. The user information can be received at a host device, such as the system 100, from a user device, such as the user device 112a, that is associated with the user.

At 320, the method 300 includes calculating a classification score. The classification score represents an estimated likelihood that the user belongs to at least one user type from multiple user types. In some embodiments, the classification score is based on a comparison between the received user information, and preexisting user account information (e.g., as may be stored in the database 170 and/or the memory 160). In some embodiments, when the user information includes user device information (e.g., a telephone number associated with the user device 112a), the classification score can be based on a comparison between the user device information and the preexisting user account information.

In some embodiments, calculating the classification score includes applying, to the user information, a classifier based on the classification score. In some embodiments, the method 300 can further include applying a set of classifiers, such as, for example, in the form of a classification tree. Each classifier can define an internal node of the classification tree, and each potential user type can define a terminal node of the classification tree.

In some embodiments, the classifier is a support vector machine. In such embodiments, the method 300 can further include, prior to receiving the user information, training the support vector machine using predetermined user information associated with predetermined user types, including the identified user type. In some embodiments, step 320 can include applying a classification tree including multiple classifiers, and a classification score can be evaluated for each classifier.

In some embodiments, additional information is can be used for the classifier to perform its function. In such embodiments, the method 300 can further include requesting and receiving additional information from the user device (e.g., via the user interface module 122). The additional information can include, for example, at least one of geospatial information, position information, environmental information, user device information, user authentication information, user expression information, and/or the like. The additional information can be applied to/serve as input to the classifier.

At 330, the method 300 includes classifying the user as an identified user type based on the classification score. In some embodiments, the classification score is compared to a classification criterion. In some embodiments, the classification score specifies a mapping between one or more values of the classification score and a user type, between one or more range of values of the classification score and/or a user type.

If the classification score meets the classification criterion, the user can be classified to the user type specified by the classification criterion. If the classification score does not meet the classification criterion, in some embodiments, a new user type can be generated. In such embodiments, the user can be classified as the new user type, and the classification criterion can be updated to associate, with the new user type, the classification score, and/or a range of possible classification score values that includes the classification score.

At 340, the method 300 includes transmitting a signal to the user device 112a. The signal specifies a user interface to be presented to the user based on the identified user type. In some embodiments, the signal is generated based on the identified user type, and further based on at least one of the user account information, historical information associated with the user (e.g., as can be provided by the analysis module 130), or historical information associated with a group of users. The group of users may or may not include the user associated with the user device. In some embodiments, the user interface is for a mobile interface of a system/service, such as for an interactive voice response (IVR) system, which is implemented on the host device.

At 350, the method 300 includes a determination of whether a database of the host device (e.g., the database 170 and/or the memory 160) includes preexisting user account information associated with the user. If this is found to be true, then at 360A, the user account information is updated to reflect the identified user type. If this is not found to be true, then at 360B, new user account information is generated that includes the identified user type, and is stored in the database.

Figure 4:
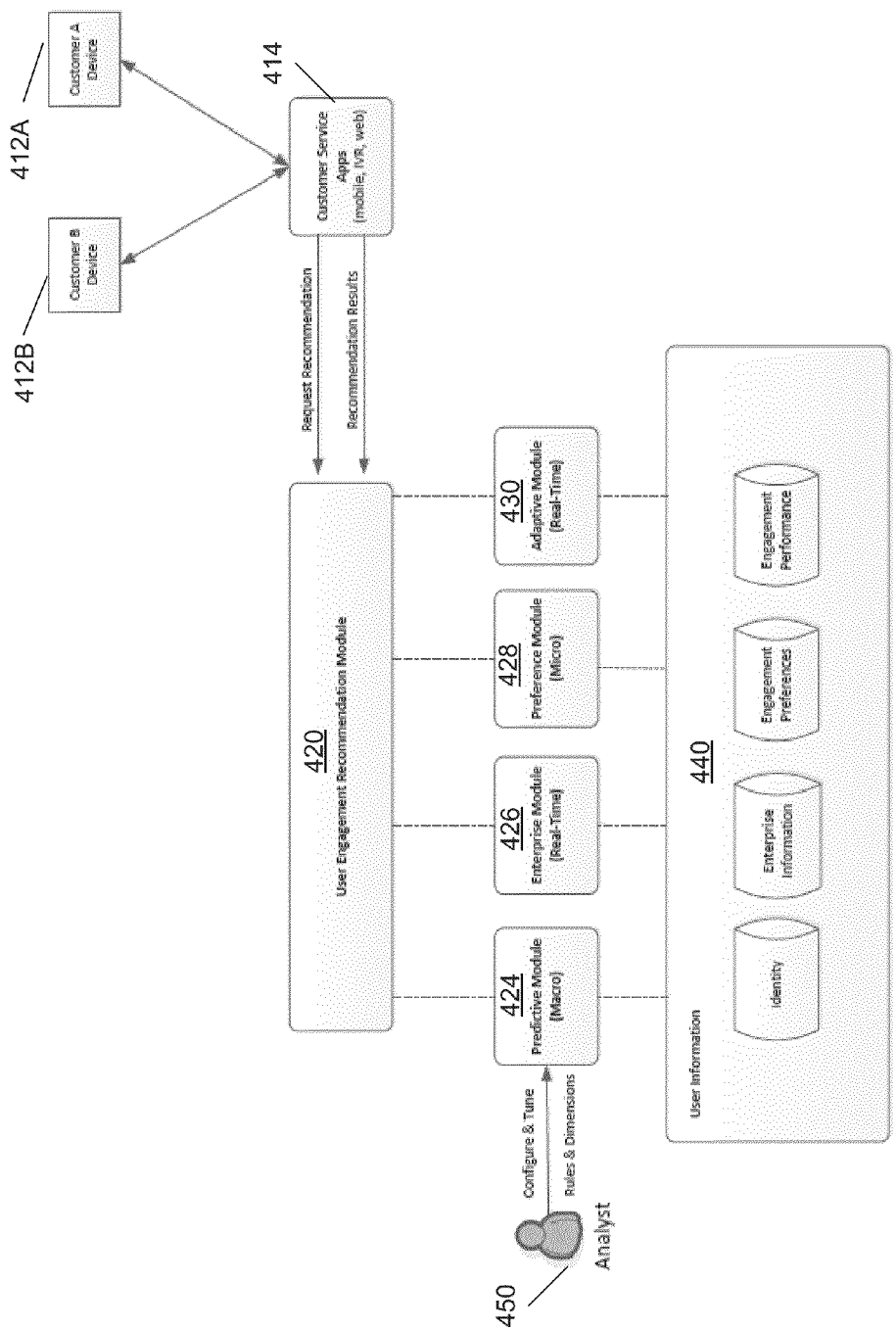
FIG. 4 is an illustration of an embodiment of the system of FIG. 1.

FIG. 4 illustrates an embodiment of the environment within which aspects of FIG. 1 can operate. Users such as the user 412A of the customer device A (e.g., similar to the device 112a of FIG. 1) and the user 412B of the customer device B (e.g., similar to the device 112b of FIG. 1) interact with a cloud-based customer service application 414 (similar to the user interface module 122 of FIG. 1), which can be an interface running on the customer device A/customer device B that is mobile-based, IVR-based, web-based, and/or the like. When one of the customer devices 412A, 412B interacts with the customer service application 414, the customer service application 414 requests an indication/specification for an interface from the user engagement recommendation module 420 (similar to the signal generation module 132 of FIG. 1) via a "request recommendation" signal.

The generation of the signal by the recommendation module 420 can be generally accomplished as described herein. The recommendation module 420 generates the signal indicative of the user interface by accounting for the 'identity' (similar to user type) of a user from a predictive module 422

(similar to the classification module 126 of FIG. 1). The predictive module 422 can use historical information stored about the user in the illustrated "user information" database 440 (similar to the historical information associated with the user and stored in the database 170 and/or the memory 160 in FIG. 1) to identify and/or classify the user as a user type that can be used to determine the user interface specification and/or recommendation. As illustrated in FIG. 4, in some embodiments, a human analyst 450 can configure and/or tune the working of the predictive module 422, including specifying rules and dimensions for classification/predictive analysis.

In some embodiments, the recommendation module 420 generates the signal indicative of the user interface by accounting for enterprise information (similar to the user account information) from an enterprise module 426 (similar to the account module 124 of FIG. 1). The enterprise module 426 can provide substantially real-time access to user account information stored in the user information database 440 such as, for example, user profile accounts, Customer Relationship Management (CRM) systems, etc. In some embodiments, for example, user account information can be derived from an organizational setting.

In some embodiments, the recommendation module 420 generates the signal indicative of the user interface by accounting for user preferences from the preference module 428 (similar to the manner in which user preferences can be gleaned from the historical information collected by the analysis module 130 of FIG. 1). The preference module 428 tracks what the users prefer to do when using the customer service application 414 on their respective devices 412A, 412B, which can be stored in the user information database 440 as engagement preferences.

In some embodiments, the recommendation module 420 generates the signal indicative of the user interface by accounting for substantially real-time interaction adjustments from the adaptive module 430 (similar to the analysis module 130 of FIG. 1) to generate the user interface. The adaptive module 430 tracks the behavior of the user (stored in the user information database 440 as engagement performance) and adapts the engagement to adjust to the user's skill level. The signal generated by the recommendation module 420 is then communicated to the customer service application 414 as "recommendation results", and can specify a user interface for engaging and interacting with the users via their respective devices 412A, 412B.

Figure 5:
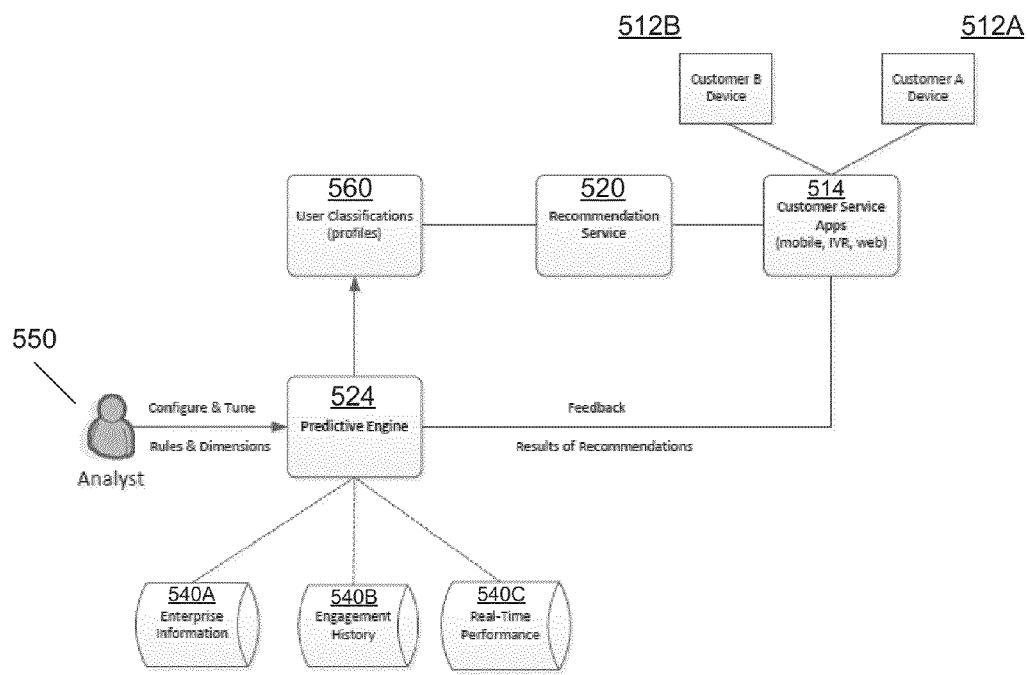
FIG. 5 is an illustration of operation of a predictive engine, according to an embodiment.

FIG. 5 illustrates components of the environment of FIG. 1 according to an embodiment. In some embodiments, a customer service application 514, at least partially running on and/or interacting with the user devices 512A, 512B, can request from the recommendation service 520 (similar to the signal generation module 132 of FIG. 1 or the recommendation module 420 of FIG. 4) menus and/or prompts to present to the user, such as in the form of a user interface (e.g., GUI, IVR, etc.). In some embodiments, the customer service application can collect and communicate to the predictive engine 522 (described herein) what the user selected. In this manner, the predictive engine can update stored information, such as the engagement history 540B and/or the real-time performance information 540C, with the user selection.

FIG. 5 is also directed to operation of a predictive engine 522 (similar to the classification module 126 of FIG. 1 and/or the predictive module 422 of FIG. 4) (e.g., for an IVR system). The predictive engine 522 is configured to classify a user based on varied information such as enterprise information 540A (similar to user account information), engagement history (similar to engagement preferences, as described for FIG. 4), substantially real-time performance of a user (e.g., of the user of the customer device A 512A or of the customer device B 512B, as described for the analysis module 130 in FIG. 1 or the adaptive module 430 in FIG. 4), and substantially real-time feedback from a customer service application (similar to the customer service application of FIG. 4). In some embodiments, the predictive engine 522 can perform one or more of the following functions to classify the user: predict to which user classification a user belongs; classify the user based on cost savings or profit goals (e.g., by using user account information, such as enterprise information; or by knowledge of the products or services to which the user subscribes, as indicated by the user account information); classify the user based on user preferences; classify the user based on user device information; classify the user based on a skill level of the user when using the customer service application 514; classify the user based on previous call history; classify the user based on unresolved transactions (e.g., based on why the user would call again); and/or classify the user based on system performance metrics (e.g., Average Wait Time, Queue Depth, Average Handle Time, etc.) to predict and/or optimize user experience. FIG. 5 also illustrates the configurable/tunable nature of the predictive engine by a human analyst 550, which in turn can affect the classification of the user.

In some embodiments, the recommendation service 520 can provide, to the user devices 512A, 512B, an indication of the user classification to which the user belongs, as determined by the predictive engine 522. In some embodiments, the recommendation service 520 can provide a signal specifying and/or identifying a set of interaction recommendations/user interfaces, and permit the user devices 512A, 512B to select which user interface to employ.

Figure 6:
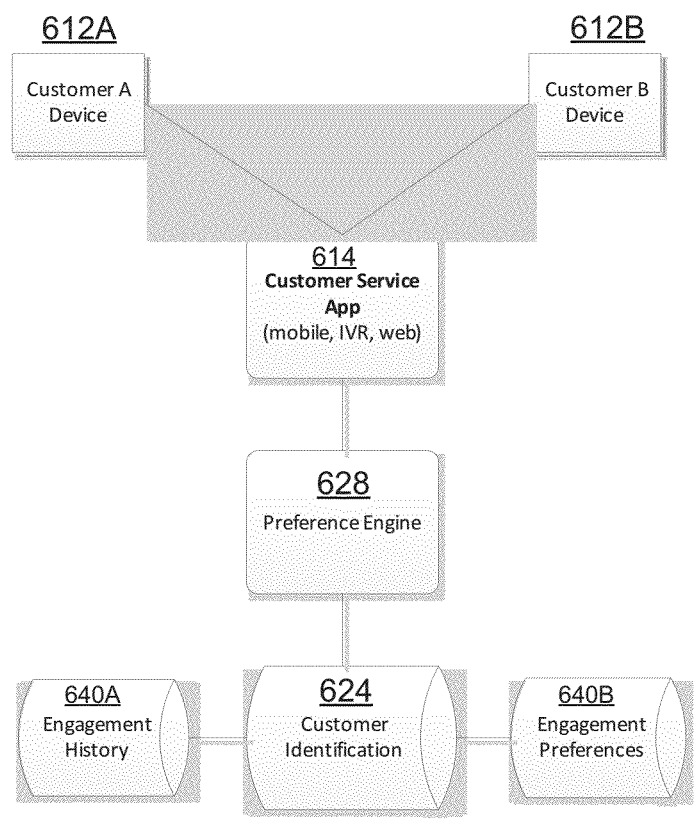
FIG. 6 is an illustration of operation of a preference engine, according to an embodiment.

FIG. 6 illustrates components of the environment of FIG. 1 according to an embodiment, directed specifically to operation of a preference engine 628 (similar to the classification module 126 of FIG. 1 and/or the preference module 428 of FIG. 4). In some embodiments, the preference engine 628 is operable to provide a user interface (e.g., GUI, IVR, etc.), or an indication thereof, to the customer service application 614 for capturing user preferences (similar to the customer service application 414 of FIG. 4) for an identified user (e.g., the users of the customer devices 612A, 612B), as well as receive user input reflecting updated user preferences from the customer service application 614.

The preference engine 628 can perform one or more of the following functions: use advanced user identification/classification methods to accurately identify the user; calculate classification scores to user identification/classification; store user preferences for an identified user (e.g., language, transaction information, communication mode(s), primary account, mobile device to contact the user on, email address to contact the user on) in a database (e.g., the database 170 and/or the memory 160) as engagement history 640A and/or preferences 640B; and reset user preferences based on input via the customer service application 614. The engagement history 640A can include history of user preference selections in the customer service application 614. The user preferences can be default values or updated over time by the user, or by the IVR system.

Figure 7A:
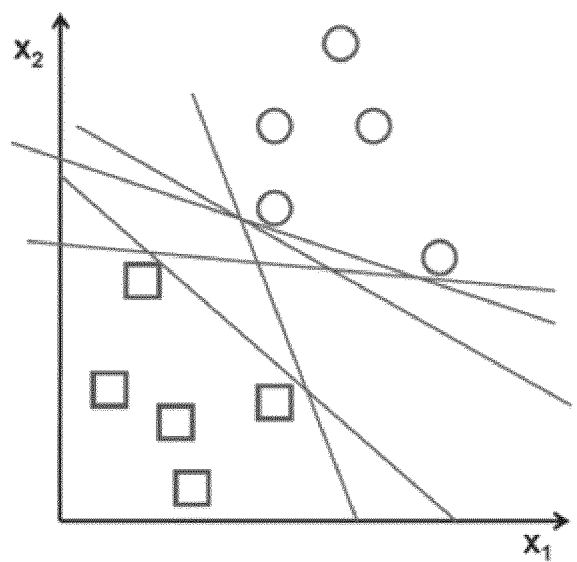
FIGS. 7A-7B are illustrations of the use of support vector networks/machines (SVMs) for classification.
Figure 7B:
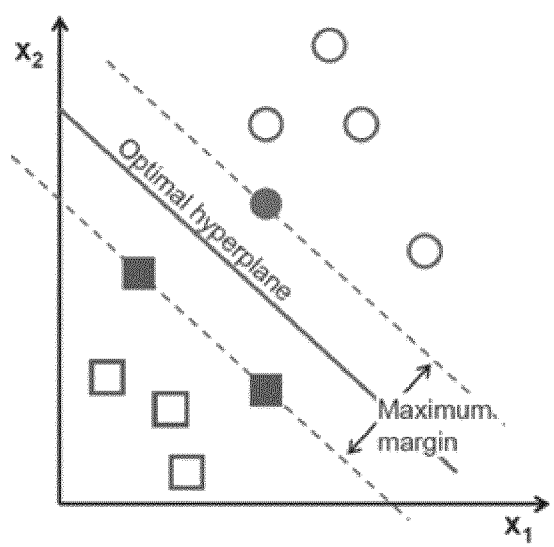

FIGS. 7A-7B are graphs illustrating the benefits of using support vector machines (SVM) as a classifier, such as can be employed by the classification module 126. For simplicity, FIGS. 7A-7B illustrate linear classification, such as of users such as whether user information during a call is indicative of fraud (circles in FIGS. 7A-7B) or non-fraud (squares in FIGS. 7A-7B). The axes $x_1$, $x_2$ in FIGS. 7A-7B are indicative of dimensions such that a dot product of $x_1$, $x_2$ defines a normal vector to a hyperplane. In some embodiments, $x_1$, $x_2$ can be associated with variables used to calculate classification scores in a manner similar to that described for Eq. (1). For example, in some embodiments, the axis $x_1$ is indicative of user latitude, and the axis x2 is indicative of user longitude. In this manner, the data point (circles, squares) can represent classification probabilities as vectors in the $x_1$, $x_2$ space.

Referring to FIG. 7A, each of the possible lines, a hyperplane, drawn that separate the circles (fraud) and squares (non-fraud/legitimate) can be used to determine whether a new data point, such as a new call/interaction with a user, fits within one grouping or the other. However, this is not optimal, and it can be desirable to determine the hyperplane that represents the largest separation, or margin, between the two groups of data, and is more likely to accurately decide which of these groups a new data point should fall under (i.e., fraudulent or legitimate). FIG. 7B illustrates the embodiment where a maximum-margin hyperplane that separates the two groupings, and is at substantially equal distance from the two groupings ("maximum margin"), is employed for classification purposes. As additional data points are available and verified to be fraud/non-fraud, the maximum-margin hyperplane can be adjusted to account for the additional data.

EXAMPLE 1

A user, such as the user of the device 112a, calls an enterprise interactive voice response (IVR) system, such as the system 100, from a new mobile phone number. The IVR system asks the user which language they prefer. Customer selects the English menu option. The IVR system asks the user for authentication information in the form of an account number and a 4 digit personal identification number (PIN). Once authenticated, the IVR system plays main menu options, and the user selects the "get balance menu" option. The user then requests that they receive a confirmation text regarding their balance to their new mobile phone number. The user completes transaction successfully and hangs up/terminates the call. The IVR system subsequently stores the user's selection of the "get balance menu" option, the user's request for a confirmation text, and the user's new phone number, as 'user preferences'. The user then calls back into the IVR system three days later. During this call/interaction, the IVR system asks the caller for the 4 digit PIN number only, the IVR system recognizes the mobile phone number from which the user has called. The IVR system also takes the user directly to the get balance menu, plays the user's balance in English, and sends the confirmation to the user's new mobile phone.

EXAMPLE 2

A user of an IVR system, such as the system 100, has a prepaid card. The user preferences (as can be determined by the preference module 126) associated with the user indicate that the user frequently calls in about his card being rejected. The user profile of the user also indicates that the user has just received a reissued, new card in the mail, as can be determined by the account module 124. The IVR system predicts (as can be determined by the classification module 126), based on the user profile and based on the day/time the user typically calls, that the user calls from his cell phone during his commute (i.e., from his car). Accordingly, when the user calls the next time, the IVR system predicts that a) the user will likely prefer a short and fast menu structure that does not require much input as they are on the go, and b) the user will likely be calling either about the reissue mailer they just received or a card rejection. The IVR system specifies (as can be specified by the signal generation module 132) and plays (via the user interface module 122) a shorter, custom menu with card reissue and card rejection options, and an 'other' option. The user hence has the option to speed up his interaction by selecting the card reissue option or the card rejection option, or to select the 'other' option to receive a non-personalized menu.

EXAMPLE 3

Figure 8:
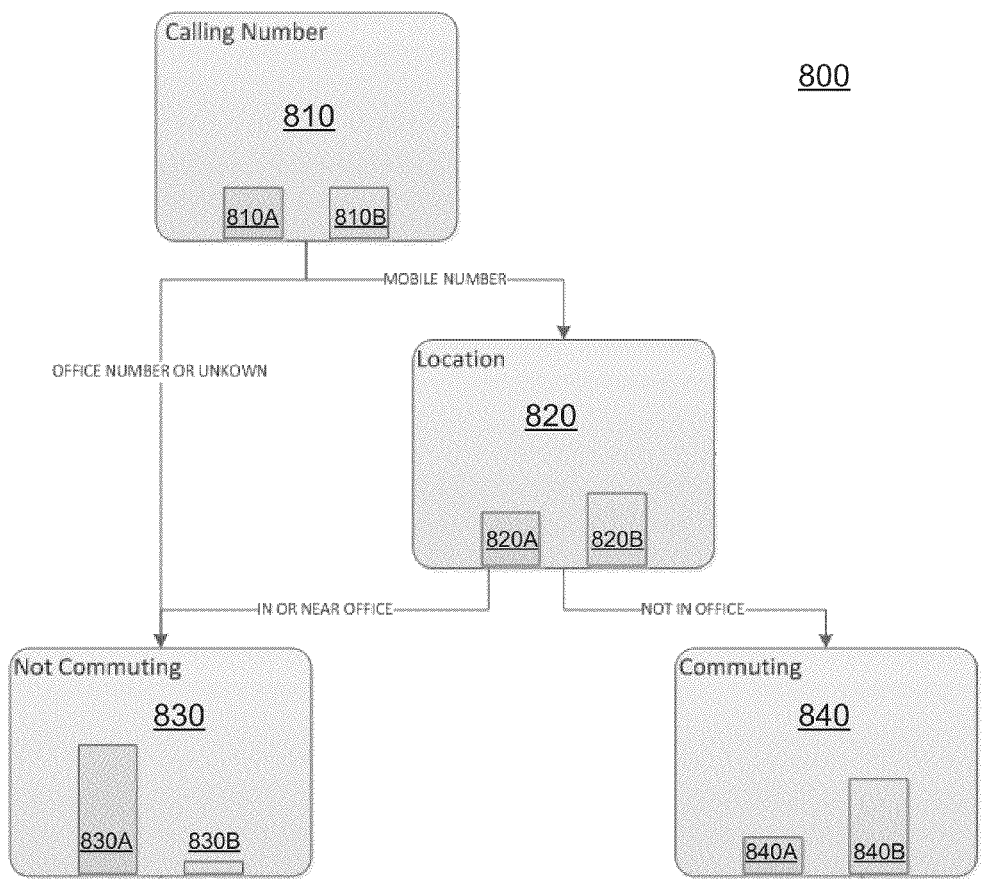
FIG. 8 is an example illustration of a classification tree, according to an embodiment.

FIG. 8 illustrates an example of a classification tree 800, such as can be employed by the classification module 132, that classifies a user calling into the system as "commuting" (terminal node 830) or "in the office" (terminal node 840). Additional terminal nodes (not shown), such that the user could also be classified as being "home", can also be included in the classification tree. The bar plots in each node are representative of probabilities of each possible outcome of the classifier, and are in turn related to classification score evaluation as described earlier. For example, the bar plots 810A, 810B can denote the probabilities that the user is calling from his office number or mobile number, respectively. As another example, the bar plots 820A, 820B can denote the probabilities that the user is in/near his office, and not in office, respectively. As another example, the bar plots 830A, 840A can denote the probability that the user is not commuting, while the bar plots 830B, 840B can denote the probability that the user is commuting. The height of each bar plot can be indicative of the relative value of the probability associated therewith compared to its counterpart bar plot in the same node. For example, node 830 illustrates that the plot 830A is significantly taller than 830B, indicating a significantly higher probability that the user is not commuting, say about 90%; as another example, node 840 illustrates that the plot 840B is relatively taller than the plot 840A, albeit the difference is lesser than that between 830A, 830B, so the probability associated with plot 840B can be smaller, say 75%.

The tree 800 starts be examining, at classification node 810, from which phone number the user is calling. If the number is the office number associated with the user account of the user, the user can be classified as not commuting, to the terminal node 830, with a high classification score. If the number is not the office number, then at classification node 820, the location of the user can be determined/estimated to generate a classification score by calculating a first probability that the user is in the office (first bar in node 820), and a second probability that the user is not in the office (second bar in node 720). Based on the classification score/first and second probabilities, the user can be classified to node 830 or node 840.

The classification can be output to the signal generation module 132 (not shown) and a signal specifying a user interface, with user preferences and overrides based on the user account information applied, can be generated and presented to the user.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, and/or files containing higher-level instructions that are executed by a computer using an interpreter. For example, embodiments may be implemented using C, Java, C++, MATLAB or other programming languages and/or other development tools.

The processors described herein can be any processors (e.g., a central processing unit (CPU), an application-specific integrated circuit (ASIC), and/or a field programmable gate array (FPGA)) configured to execute one or more instructions received from, for example, a memory. In some embodiments, at least one processor can be a Reduced Instruction Set computing (RISC) processor. Each processor can be in communication with a memory and/or a network card. In some embodiments, each processor can accordingly send information (e.g., data, instructions and/or network data packets) to and/or receive information from a memory and/or a network card.

The memory can be any memory (e.g., a RAM, a ROM, a hard disk drive, an optical drive, other removable media) configured to store information (e.g., one or more software applications, user account information, media, text, etc.). The memory can include one or more modules performing the functions described herein. In some embodiments, the functions described herein can be performed by any number of modules. For example, in some embodiments, the functions described herein can be performed by a single module.

While various embodiments have been described above, it should be understood that they have been presented by way of example, and not limitation. Where methods described above indicate certain events occurring in certain order, the ordering of certain events can be modified. Additionally, certain of the events may be performed concurrently in a parallel process when possible, as well as performed sequentially as described above.

What is claimed is:

1. An apparatus, comprising:
    a user interface module implemented in at least one of a memory or a processing device, the user interface module configured to receive, from a user device associated with a user, user information associated with the user;
    a classification module operatively coupled to the user interface module, the classification module configured to:
        apply a classifier defined within a classification tree to the user information, including calculating a classification score representing an estimated likelihood that the user is associated with at least one user type from a plurality of user types,
        compare the classification score to a classification criterion associated with an identified user type from the plurality of user types, and
        classify, when the classification score meets the classification criterion, the user as the identified user type;
    a database configured to store at least one of user account information associated with the user, historical information associated with the user, or historical information associated with a group of users including the user; and
    an interface generation module configured to generate a signal based on the identified user type, the user account information, the historical information associated with the user, and the historical information associated with the group of users, the signal specifying a user interface to be presented to the user,
    the user interface module configured to transmit the signal to the user device.

2. The apparatus of claim 1, wherein the user interface is a mobile-based interface for an interactive system implemented on a host device.

3. The apparatus of claim 1, wherein each user type from the plurality of user types is associated with at least one of a different level of fraudulent activity by the user, or a different type of fraudulent activity by the user.

4. The apparatus of claim 1, wherein the classifier defines an internal node of the classification tree and each user type from the plurality of user types defines a terminal node of the classification tree.

5. An apparatus, comprising:
    a user interface module of an interactive system and implemented in at least one of a memory or a processing device, the user interface module configured to receive, from a user device associated with a user, user information associated with the user; and
    a classification module operatively coupled to the user interface module, the classification module configured to:
        apply a classifier to the user information to calculate a classification score, the classification score representing an estimated likelihood that the user belongs to at least one user type from a plurality of user types, each user type from the plurality of user types associated with at least one of a different level of fraudulent activity by the user, or a different type of fraudulent activity by the user; and
        classify the user to an identified user type from the plurality of user types based on the classification score by (1) comparing the classification score to a classification criterion and (2) classifying, when the classification score meets the classification criterion, the user as the identified user type specified by the classification criterion,
    the user interface module configured to transmit a signal to the user device, the signal specifying a user interface for the IVR system to be presented to the user based on the identified user type.

6. The apparatus of claim 5, wherein the classification module is configured to apply a plurality of classifiers in the form of a classification tree, each classifier from the plurality of classifiers defining an internal node of the classification tree, each user type from the plurality of user types defining a terminal node of the classification tree.

7. The apparatus of claim 5, wherein the classifier is a support vector network, the classification module further configured to train the classifier using predetermined user information associated with predetermined user types from the plurality of user types.

8. The apparatus of claim 5, wherein the user interface module is further configured to:
request additional information from the user device; and
receive, in response to the request, the additional information,
the classification module further configured to apply the classifier to the additional information, the additional information including at least one of geospatial information, position information, environmental information, motion information, user device information, or user authentication information.

9. The apparatus of claim 5, wherein the user information includes user device information, the classification module configured to calculate the classification score by comparing the user device information with user account information.

10. The apparatus of claim 5, further comprising an interface generation module configured to generate the signal based on the identified user type and at least one of user account information, historical information associated with the user, or historical information associated with a group of users.

11. The apparatus of claim 5, further comprising an interface generation module configured to generate the signal based on the identified user type and based on historical information associated with the user, the historical information based on previous interactions with the user.

12. The apparatus of claim 5, further comprising an interface generation module configured to generate the signal based on the identified user type and based on historical information associated with a group of users, the historical information based on fraud analysis of previous interactions with the group of users.

13. The apparatus of claim 5, further comprising:
a database configured to store user account information associated with the user, historical information associated with the user, or historical information associated with a group of users; and
an interface generation module configured to generate the signal based on the identified user type, the user account information, the historical information associated with the user, and historical information associated with a group of users.

14. The apparatus of claim 5, wherein when the classification score does not meet the classification criterion the classification module is further configured to:
generate a new user type;
classify the user as the new user type;
update the plurality of user types to includes the new user type; and
update the classification criterion to specify at least one of the classification score or a range including the classification score, as associated with the new user type.

15. The apparatus of claim 5, wherein the classification criterion specifies a mapping between at least one of (1) one or more possible values of the classification score and one or more user types of the plurality of user types, or (2) one or more possible ranges of the classification score and one or more user types of the plurality of user types.

16. A method, comprising:
receiving at a host device, from a user device associated with a user, user information associated with the user;
calculating a classification score representing an estimated likelihood that the user belongs to at least one user type from a plurality of user types;
comparing the classification score to a classification criterion associated with an identified user type from the plurality of user types,
classifying, when the classification score meets the classification criterion, the user as the identified user type from the plurality of user types;
transmitting a signal to the user device, the signal specifying a user interface to be presented to the user based on the identified user type;
if a database associated with the host device includes preexisting user account information associated with the user, updating the user account information to include an indication of the identified user type; and
if the database does not include preexisting user account information associated with the user:
defining new user account information for the user, the new user account information including an indication of the identified user type; and
storing the new user account information in the database.

17. The method of claim 16, wherein the calculating the classification score includes applying to the user information a classifier based on the classification score, the method further comprising applying a plurality of classifiers, each classifier from the plurality of classifiers defining an internal node of a classification tree, each user type from the plurality of user types defining a terminal node of the classification tree.

18. The method of claim 16, wherein the calculating the classification score includes applying to the user information a classifier based on the classification score, the classifier being a support vector machine, the method further comprising, prior to receiving the user information, training the support vector machine using predetermined user information associated with a plurality of predetermined user types including the identified user type.

19. The method of claim 16, wherein the calculating the classification score includes:
applying, to the user information, a classification tree including a plurality of classifiers, the classification score being associated with a classifier from the plurality of classifiers; and
evaluating a classification score for each classifier from the plurality of classifiers.

20. The method of claim 16, wherein the calculating the classification score includes comparing the user information with user account information.

21. The method of claim 16, wherein the user information includes user device information, the calculating the classification score including comparing the user device information with user account information.

22. The method of claim 16, wherein the calculating the classification score includes:
requesting additional information from the user device;
receiving, in response to the request, additional information; and
applying at least one classifier to the additional information,
the additional information is at least one of geospatial information, position information, environmental information, motion information, user device information, user authentication information, or user expression information.

23. The method of claim 16, wherein the database includes preexisting user account information associated with the user, the user information including user device information, the calculating the classification score includes comparing the user device information with user account information.

24. The method of claim 16, wherein the database includes preexisting user account information associated with the user, the method further comprising:

generating the signal based on the identified user type and at least one of the user account information, historical information associated with the user, or historical information associated with a group of users including the user.

25. The method of claim 16, further comprising:
when the classification score does not meet the classification criterion:
  generating a new user type;
  classifying the user as the new user type; and
  updating the classification criterion to associate with the new user type at least one of the classification score or a range including the classification score.

26. The method of claim 16, wherein the classification criterion specifies a mapping between at least one of a possible value of the classification score and a user type from the plurality of user types, or a possible range of the classification score and a user type from the plurality of user types associated with the possible range.

27. The method of claim 16, wherein the user interface is for an interactive voice response (IVR) system implemented on the host device.

\* \* \* \* \*